(12) United States Patent
Ueda et al.

(10) Patent No.: US 7,416,350 B2
(45) Date of Patent: Aug. 26, 2008

(54) OPTICAL CONNECTOR

(75) Inventors: Yoshihisa Ueda, Ebina (JP); Toshimichi Iwamori, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 40 days.

(21) Appl. No.: 11/526,713

(22) Filed: Sep. 26, 2006

(65) Prior Publication Data

US 2007/0183722 A1 Aug. 9, 2007

(30) Foreign Application Priority Data

Feb. 8, 2006 (JP) .............................. 2006-031191

(51) Int. Cl.
*G02B 6/36* (2006.01)

(52) U.S. Cl. .............................. 385/78; 385/76; 385/139

(58) Field of Classification Search .................. 385/76, 385/78, 88, 91, 92, 100, 103, 113, 139, 147
See application file for complete search history.

(56) References Cited

U.S. PATENT DOCUMENTS

| | | | | |
|---|---|---|---|---|
| 6,076,976 | A * | 6/2000 | Kidd | 385/84 |
| 6,796,721 | B2 * | 9/2004 | Matsumoto et al. | 385/86 |
| 6,935,790 | B2 * | 8/2005 | Ozaki | 385/78 |

FOREIGN PATENT DOCUMENTS

| | | |
|---|---|---|
| JP | 9-55592 | 2/1997 |
| JP | 2000-56162 | 2/2000 |
| JP | 2000-349459 | 12/2000 |
| JP | 2001-297807 | 10/2001 |
| JP | 2005-38785 | 2/2005 |

* cited by examiner

*Primary Examiner*—Kevin S Wood
(74) *Attorney, Agent, or Firm*—Morgan, Lewis & Bockius LLP

(57) ABSTRACT

An optical connectorcomprises an optical cable; and a ferrule that is attached to an end of the optical cable and performs optical connection; a cover that defines a through hole that the optical cable passes through, the cover covering the ferrule without contacting the ferrule; and a removal-preventing section that is disposed inside a wall that the through hole of the cover is formed on, and the removal-preventing section preventing a pulling force applied to the optical cable from being transferred to the ferrule.

12 Claims, 5 Drawing Sheets

OPTICAL CONNECTOR

BACKGROUND (i) Technical Field

The invention relates to an optical connector that establishes optical connection with a mating connector when mated thereto.

(ii) Related Art

There is known a system in which electronic devices communicate with each other by exchanging optical signals when they are connected via optical cables. Generally, connection between an optical cable and an electronic device is established by the coupling between the respective optical connectors. It is important to keep the connectors in a good mating state in order to prevent degradation of optical signals.

SUMMARY

According to an aspect of the invention, an optical connector comprises:

an optical cable;

a ferrule that is attached to an end of the optical cable and performs optical connection;

a cover that defines a through hole that the optical cable passes through, the cover covering the ferrule without contacting the ferrule; and a removal-preventing section that is disposed inside a wall that the through hole of the cover is formed on, the removal-preventing section preventing a pulling force applied to the optical cable from being transferred to the ferrule.

BRIEF DESCRIPTION OF THE DRAWINGS

Exemplary embodiment(s) of the present invention will be described in detail based on the following figures, wherein.

DETAILED DESCRIPTION

Figure 1:
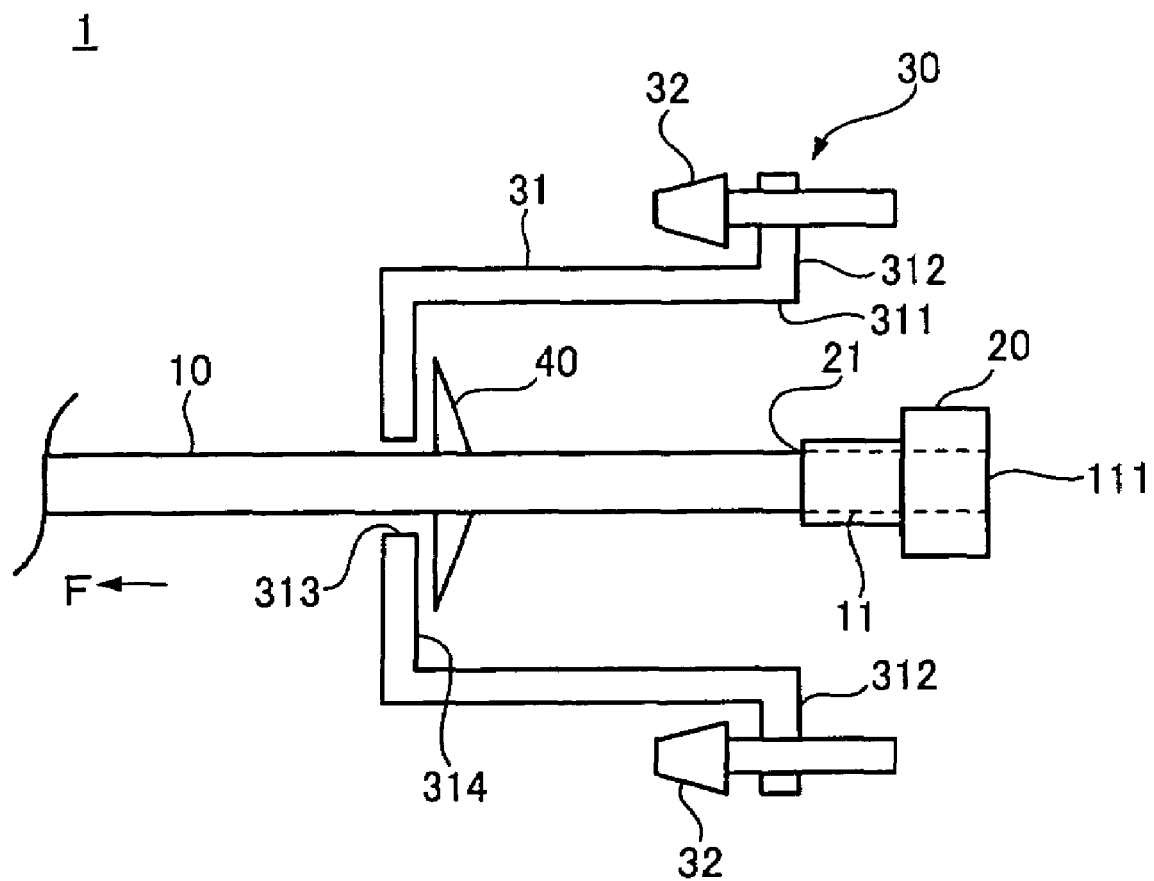
FIG. 1 is a sectional view of an optical connector according a first exemplary embodiment of the invention.

Referring now to the drawings, exemplary embodiments of the optical connector of the invention will be described.

Figure 2:
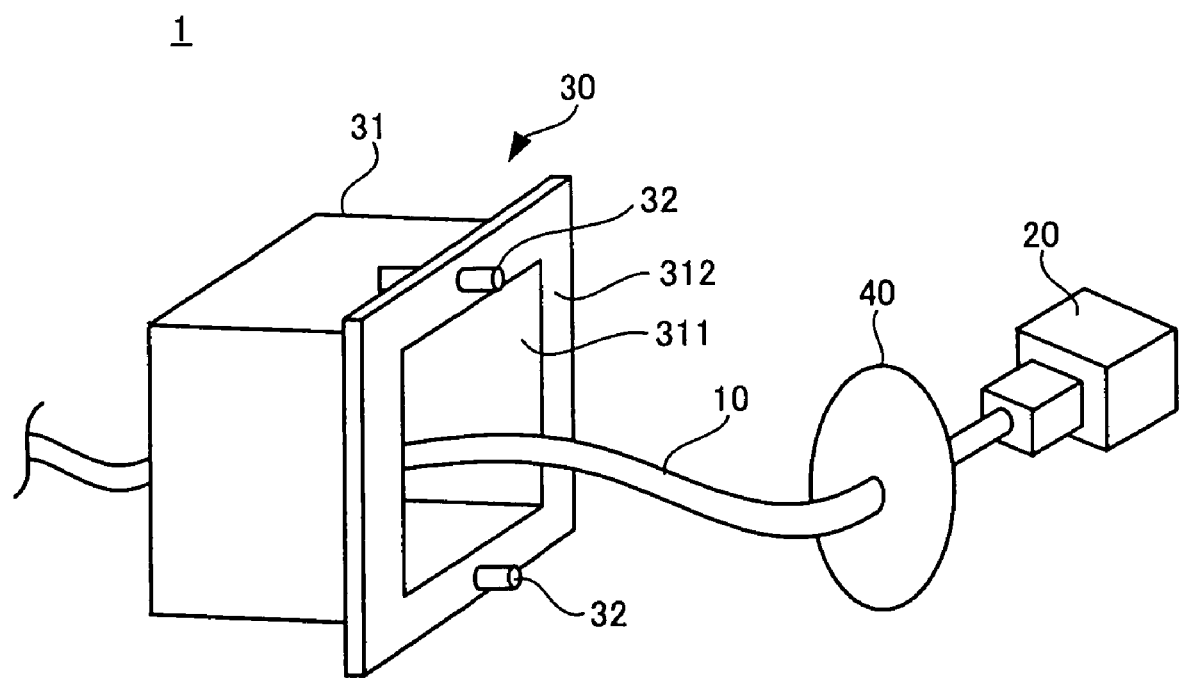
FIG. 2 is a perspective view of the optical connector shown in FIG. 1 from which an optical cable is pulled out.

FIG. 1 is a sectional view of an optical connector 1 according to a first exemplary embodiment of the invention. FIG. 2 is a perspective view of the optical connector 1 shown in FIG. 1 from which an optical cable is pulled out.

The optical connector 1 shown in FIGS. 1 and 2 is capable of establishing optical connection with a mating connector of an electronic device or the like, when mated with the mating connector. The optical connector 1 includes an optical cable 10 for transferring optical signals, a ferrule 20 to be engaged with a mating connector, a cover 30 and a stopper 40.

The optical cable 10 is an optical fibercable having glass or plastic fibers therein. The optical cable 10 is elastic so as to be able to be bent.

The ferrule 20 is an injection-molded member, made of resin, and has a hole 21 into which an end 11 of the optical cable 10 is inserted. The end 11 of the optical cable 10 has an end surface 111. The end 11 of the optical cable 10 is inserted into the hole 21 from one end of the hole 21 up to the other end of the hole 21 where the end surface 111 of the end 11 appears. In this way, the ferrule 20 is attached to the end 11 of the optical cable 10. When the ferrule 20 is engaged with a mating connector, the end surface 111 comes into contact with an optical path of the mating connector, thereby establishing optical connection between the optical cable 10 and the mating connector.

The cover 30 is a member that covers the ferrule 20 in the state of being engaged with the mating connector. The cover 30 includes a cover wall 31 and two screws 32 for fixing the cover wall 31 to an electronic device to which the mating connector is secured. The cover wall 31 is an injection-molded member made of resin. The cover wall 31 is shaped like a box, and has an opening 311 in the direction that the ferrule 20 is engaged with the mating connector, and a bottom 314 being opposite the opening 311. The cover 30 has a rim 312 surrounding the opening 311 and having holes into which the screws 32 are inserted. The bottom 314 of the cover wall 31 has a through hole 313 for allowing the optical cable 10 to pass therethrough. The diameter of the through hole 313 is slightly larger than the outer diameter of the optical cable 10.

The stopper 40 is an elastic member being approximately conical in shape, and fixed to part of the optical cable 10. The optical cable 10 is drawn through and fixed at the center of the stopper 40. For convenience of explanation, FIG. 2 illustrates the state when such part of the optical cable 10 that is fixed to the stopper 40 is pulled out from the through hole 313. As shown in FIG. 1, however, the stopper 40 remains inside the cover wall 31 when the connector 1 is in use. Even if the optical cable 10 is pulled by a pulling force F that pulls opposite to the direction towards the end 11 of the optical cable 10, the stopper 40 is pressed against the bottom 314 of the cover wall 31, thereby preventing the pulling force F from being transferred to the ferrule 20. The stopper 40 corresponds to an example of the "removal-preventing section" of the invention.

Figure 3:
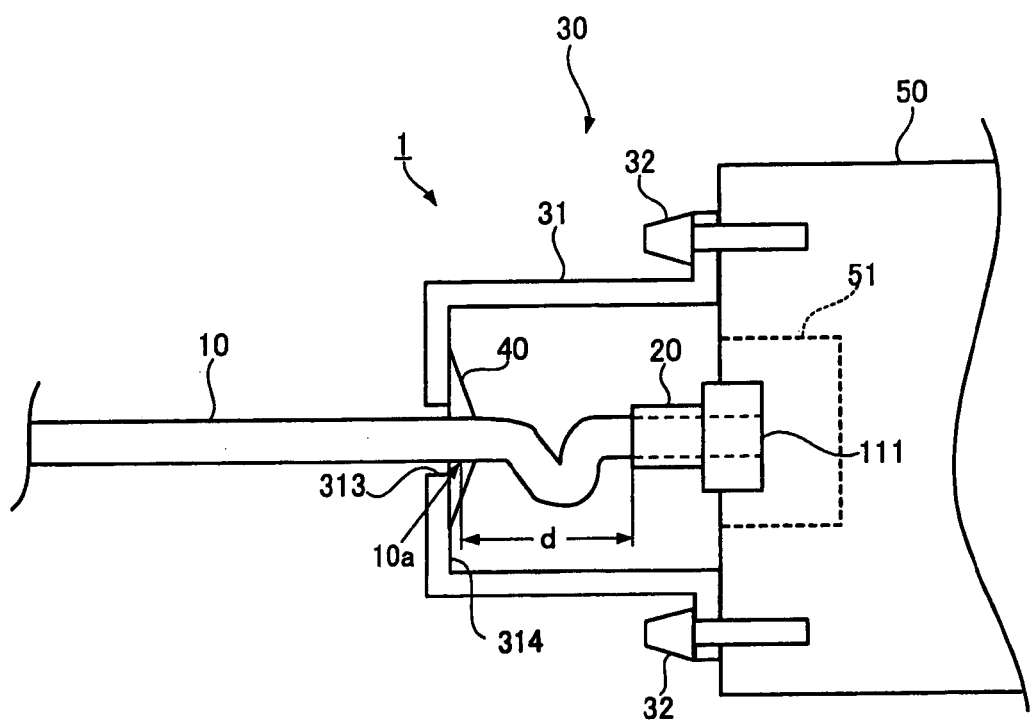
FIG. 3 is a sectional view of the optical connector shown in FIG. 1 in the state of being mated with a mating connector attached to an electronic device.

FIG. 3 is a sectional view of the optical connector 1 shown in FIG. 1 in the state of being mated to a mating connector 51 attached to an electronic device 50.

The mating connector 51 is attached to the electronic device 50 and optically connected to various components disposed inside the electronic device 50. In the present exemplary embodiment, the mating connector 51 is a female connector while the optical connector 1 is a male connector. The ferrule 20 of the optical connector 1 is inserted into and engaged with the mating connector 51. Accordingly, the end surface 111 of the optical cable 10 is in contact with an optical path of the mating connector 51, thereby establishing optical connection between the optical cable 10 and the mating connector 51. The cover 30 of the optical connector 1 is fixed to the electronic device 50 with the screws 32 and covers the ferrule 20 in the state of being engaged with the mating connector 51. The ferrule 20 is entirely covered by the cover 30 without being touched by the cover 30.

Because the cover 30 is not contact with the ferrule 20, the cover 30 can protect the ferrule 20 by absorbing shocks, when the cover 30 is accidentally hit by an object falling from above the optical connector 1, other connector attached to the electronic device 50 adjacent to the optical connector 1, part of the body of a worker, tools, etc. In addition, because the cover 30 is secured to the electronic device 50 with the screws 32, the cover 30 will not touch the ferrule 20 even when an object accidentally hits the cover 30.

The stopper 40 is fixed at such a position 10a that allows the length of a part of the optical cable 10, between the stopper 40 and the ferrule 20 in the state when the ferrule 20 is engaged with the mating connector 51, to be longer than a distance "d" in a straight line. As a result, in the mated state as shown in FIG. 3, the part of the optical cable 10 between the position 10a and the ferrule 20 is curved inside the cover 30. Thanks to its resilience, the cable 10 presses the ferrule 20 against the mating connector 51 while pressing the stopper 40 against the bottom 314 of the cover wall 31. Accordingly, even if the pulling force F (see FIG. 1) that acts opposite to the direction towards the end 11 is exerted on the optical cable 10, the stopper 40 prevents the transfer of the pulling force F to the ferrule 20.

As described above, the optical connector 1 of the present exemplary embodiment is configured such that the cover 30, through which the optical cable 10 is drawn and covers the ferrule 20, without contacting the ferrule 20, connecting the optical cable 10 to the mating connector 51. This configuration allows the ferrule 20 to be free from contact with any external objects as well as direct shocks caused by hitting objects, thereby maintaining the ferrule 20 and the mating connector 51 in a good engaged state. Furthermore, because the stopper 40 is provided to prevent the transfer of the pulling force F exerted on the optical cable 10 to the ferrule 20, it is possible to avert loosening of the mating, i.e. deterioration of the connection state, even if the optical cable 10 is caught and pulled by an external device, part of the body of a worker, or the like. Accordingly, the optical connection between the optical connector 1 and the mating connector 51 is reliably secured.

The stopper 40 positioned inside the cover wall 31 prevents the transfer of the pulling force F to the ferrule 20 by being pressed against the cover wall 31. Accordingly, the optical cable 10 is more movable in a certain range at the through hole 313 when there is no inclination, twisting and pulling force, as compared to a case where the optical cable 10 is fixed to the through hole 313 with an adhesive etc. Therefore, it is possible to prevent damage to the optical cable 10 by reducing mechanical stress applied to the stopper 40 of the optical cable 10. Meanwhile, the optical connector 1 is connected to the mating connector 51 in the following manner. First, as shown in FIG. 2, a part of the optical cable 10, to which the stopper 40 is fixed, is pulled out from the cover 30 in the direction of the ferrule 20. In this state, the ferrule 20 is inserted into the mating connector 51 and engaged therewith. The optical cable 10 is then pulled in the direction opposite to the ferrule 20 until the stopper 40 and the ferrule 20 are housed in the cover 30. Finally, the cover 30 is secured to the electronic device 50 with the screws 32. By pulling a part of the optical cable 10 out of the cover 30 in the direction of the ferrule 20 in this way, it is possible to independently and thus readily carry out the engagement of the ferrule 20 with the mating connector 51 and the fixing of the cover 30.

Now, a second exemplary embodiment of the invention will be described. In the following description, the same components as those of the first exemplary embodiment will be denoted by the same reference characters as those of the first exemplary embodiment, and the description will focus on only the features different from the first exemplary embodiment.

Figure 4:
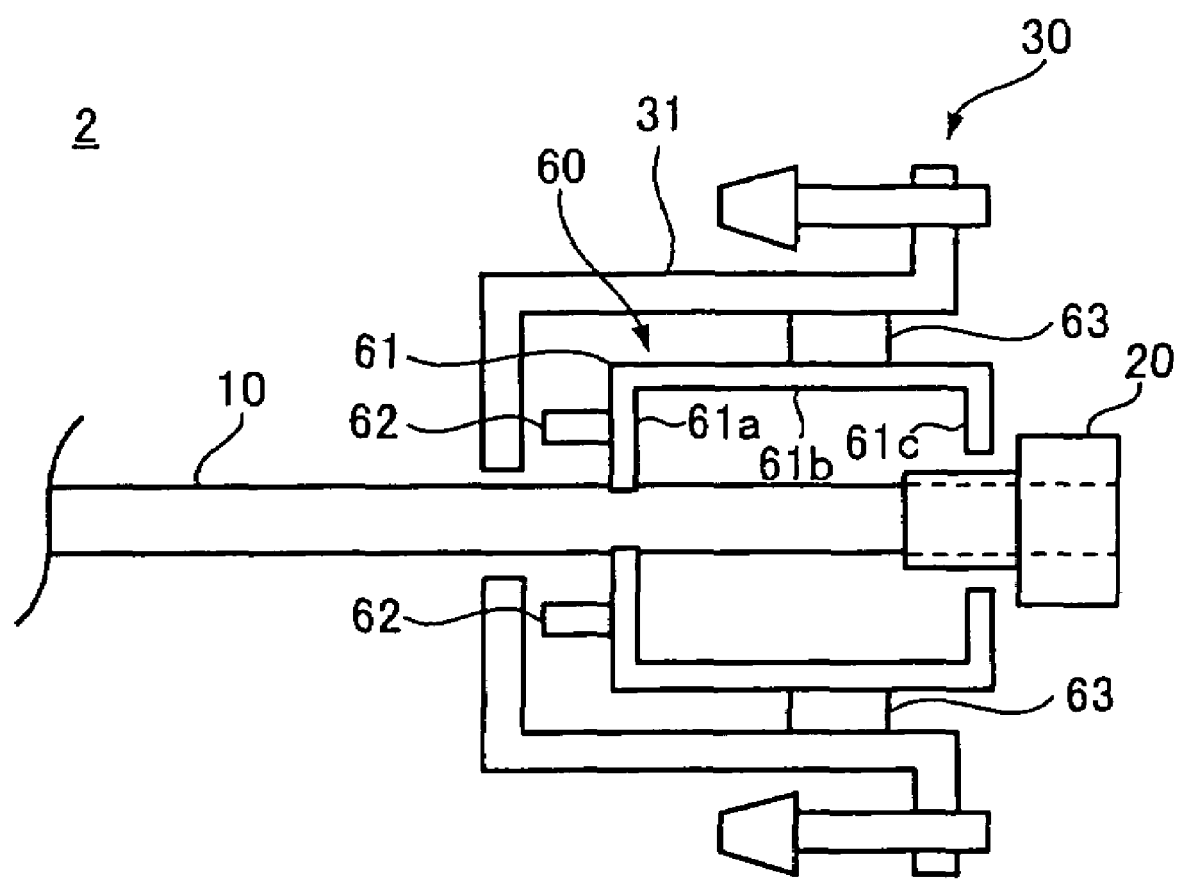
FIG. 4 is a sectional view of an optical connector according to a second exemplary embodiment of the invention.

FIG. 4 is a sectional view of an optical connector 2 according to the second exemplary embodiment of the invention. FIG. 4 is similar to FIG. 1 illustrating the first exemplary embodiment.

The optical connector 2 shown in FIG. 4 has a stopper 60 in place of the stopper 40 of the optical connector 1 in the first exemplary embodiment. The stopper 60 has a stopper body 61 and elastic members 62 and 63. The stopper body 61 is a member approximately shaped like a box, and includes: a bottom 61a at a center of which an optical cable 10 is fixed; sidewalls 61b disposed in parallel with the optical cable 10; and a top 61c opposite the bottom 61a. The stopper body 61 allows the optical cable 10 to pass therethrough from the bottom 61a to the top 61c. The elastic member 62 is fixed to the bottom 61a while the elastic member 63 is fixed to the sidewalls 61b. These elastic members 62 and 63 are slidable with respect to the cover 30.

The top 61c of the stopper body 61 has an opening for allowing a part of the ferrule 20 to move therein while prohibiting another part of the ferrule 20 to pass therethrough. Accordingly, in the state when the ferrule 20 is engaged with a mating connector and the cover 30 is fixed to an electronic device to which the mating connector is attached, the ferrule 20 causes the elastic member 62 to be deformed by pressing the top 61c of the stopper body 61 against the cover 30. In return, the elastic member 62 presses the stopper body 61 in the direction of the ferrule 20, thereby allowing the stopper body 61 to press the ferrule 20 against the mating connector. The stopper body 61 corresponds to an example of the "pressing member" according to the invention.

Figure 5:
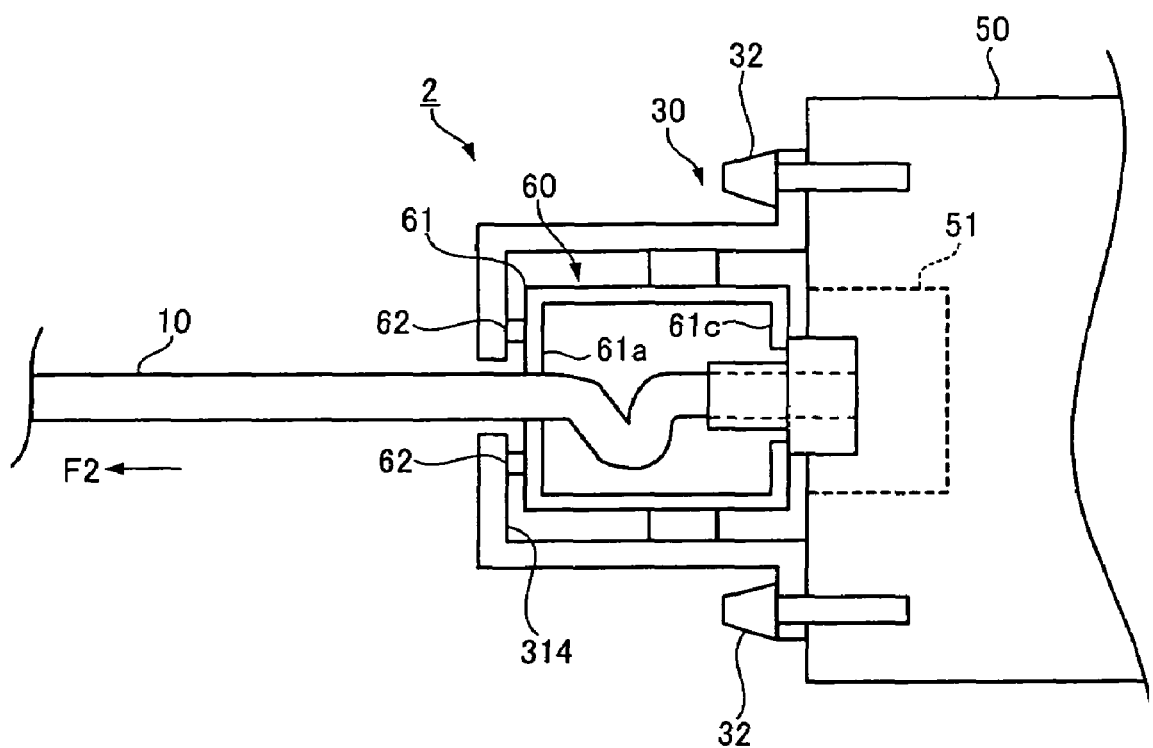
FIG. 5 is a sectional view of the optical connector shown in FIG. 4 in the state of being mated with a mating connector of an electronic device.

FIG. 5 is a sectional view of the optical connector 2 shown in FIG. 4 in the state of being mated with a mating connector 51 of an electronic device 50.

The ferrule 20 of the optical connector 2 is inserted into and thus engaged with the mating connector 51 attached to the electronic device 50. The optical cable 10 of the optical connector 2 is thus optically connected to the mating connector 51.

The cover 30 of the optical connector 2 covers the ferrule 20 in the state of being engaged with the mating connector 51 without contacting the ferrule 20, and is fixed to the electronic device 50 with screws 32. In this state, the ferrule 20 presses the stopper body 61 against a bottom 314 of the cover 30, thereby deforming the elastic member 62. In return, the elastic member 62 presses the stopper body 61 in the direction of the ferrule 20, thereby allowing the top 61c of the stopper body 61 to press the ferrule 20 against the mating connector 51. As a result, the ferrule 20 is more firmly engaged with the mating connector 51, thereby more reliably connecting the optical connector 2 with the mating connector 51. According to the second exemplary embodiment, since the elastic member 62 is provided to press the ferrule 20, the ferrule 20 can be pressed against the mating connector 51 even if the resilience of the optical cable 10 is not strong enough to press the ferrule 20 against the mating connector 51.

In addition, because the elastic member 62 is pressed against inner walls of the cover 30, mechanical stress applied to the optical cable 10 can be reduced even when a pulling force F2 is exerted on the optical cable 10, and thus damage to the optical cable 10 can be prevented.

In the exemplary embodiments, although the cover wall 31 of the cover 30 has been described as a molded member made of resin, the invention is not limited thereto. For example, the cover wall 31 of the cover 30 may be made of any material including metal such as aluminum, and also may be produced by any method including molding, deep-cutting, trimming, etc. The cover wall made of conductive metal such as aluminum can reduce electromagnetic noise. The cover wall made of resin can also produce a similar effect with the mixing of a conductive material into the resin.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An optical connector comprising:
an optical cable;
a ferrule that is attached to an end of the optical cable and performs optical connection;
a cover that defines a through hole that the optical cable passes through, the cover covering the ferrule without contacting the ferrule; and
a removal-preventing section that is disposed inside a wall that the through hole of the cover is formed on, wherein the removal-preventing section is fixed to the optical cable and prevents a pulling force applied to the optical cable from being transferred to the ferrule by being pressed against the cover.

2. The optical connector according to claim 1, wherein the optical connector establishes optical connection with a mating connector when mated to the mating connector, and the ferrule optically connects the optical cable to the mating connector when engaged with the optical connector, and the cover covers the ferrule that is engaged with the mating connector.

3. The optical connector according to claim 1, wherein the removal-preventing section comprises:
an elastic member that is pressed against an inner wall of the cover; and
a pressing member that is fixed to the optical cable and presses the ferrule against the mating connector by a pressing force received from the elastic member.

4. The optical connector according to claim 1, wherein the removal-preventing section is fixed to the optical cable at a fixing position so that a length of the optical cable between the ferrule and the fixing position is longer than a distance in a straight line between the ferrule and the fixing position.

5. The optical connector according to claim 1, wherein the ferrule has a front for mating with a mating connector, a back for receiving the optical cable, and an entire side periphery which is physically separated from contact with any other structures.

6. An optical connector comprising:
an optical cable;
a ferrule attached to an end of the optical cable to make an optical connection;
a cover defining a space inside of which the ferrule is disposed so that the cover covers the ferrule with an air gap defined between the cover and the ferrule, the cover further defining a through hole through which the optical cable passes; and
a removal-preventing section disposed inside the cover and fixed to the optical cable to prevent a pulling force applied to the optical cable from being transferred to the ferrule by being pressed against the cover.

7. The optical connector according to claim 6, wherein the optical connector establishes optical connection with a mating connector when mated to the mating connector, and the ferrule optically connects the optical cable to the mating connector when engaged with the optical connector, and the cover covers the ferrule that is engaged with the mating connector.

8. The optical connector according to claim 7, wherein the removal-preventing section comprises:
an elastic member to be pressed against an inside wall of the cover; and
a pressing member fixed to the optical cable, the pressing member pressing the ferrule against the mating connector by a pressing force received from the elastic member.

9. The optical connector according to claim 6, wherein the removal-preventing section is fixed to the optical cable at a fixing position so that the length of the optical cable between the ferrule and the fixing position is longer than a distance in a straight line between the ferrule and the fixing position.

10. The optical connector according to claim 6, wherein the ferrule has a front for mating with a mating connector, a back for receiving the optical cable, and an entire side periphery which is physically separated from contact with any other structures.

11. The optical connector according to claim 1, wherein the removal-preventing section is an elastic member being approximately conical in shape.

12. The optical connector according to claim 6, wherein the removal-preventing section is an elastic member being approximately conical in shape.

* * * * *